(12) United States Patent
Guo et al.

(10) Patent No.: US 10,146,059 B2
(45) Date of Patent: Dec. 4, 2018

(54) PARALLAX BARRIER AND FABRICATING METHOD THEREOF, DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Huibin Guo, Beijing (CN); Zhenyu Zhang, Beijing (CN); Shoukun Wang, Beijing (CN); Liangliang Li, Beijing (CN); Yuchun Feng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 14/436,763

(22) PCT Filed: Sep. 23, 2014

(86) PCT No.: PCT/CN2014/087141
§ 371 (c)(1),
(2) Date: Apr. 17, 2015

(87) PCT Pub. No.: WO2015/169030
PCT Pub. Date: Nov. 12, 2015

(65) Prior Publication Data
US 2016/0139421 A1 May 19, 2016

(30) Foreign Application Priority Data
May 4, 2014 (CN) .......................... 2014 1 0184496

(51) Int. Cl.
*G02F 1/1345* (2006.01)
*G02F 1/1333* (2006.01)
(Continued)

(52) U.S. Cl.
CPC ....... *G02B 27/2214* (2013.01); *G02B 27/225* (2013.01); *G02F 1/1341* (2013.01);
(Continued)

(58) Field of Classification Search
CPC ............ G02B 27/2214; G02F 1/133345; G02F 1/1345
See application file for complete search history.

(56) References Cited

U.S. PATENT DOCUMENTS 4,501,472 A * 2/1985 Nicholson ................. G02F 1/15
359/275
7,615,336 B2 11/2009 Lee
(Continued)

FOREIGN PATENT DOCUMENTS

CN 1869809 A 11/2006
CN 102662283 A 9/2012
(Continued)

OTHER PUBLICATIONS

International Search Report of PCT/CN2014/087141 in Chinese with English Translation, dated Feb. 11, 2015.
(Continued)

*Primary Examiner* — Jessica M Merlin
(74) *Attorney, Agent, or Firm* — Collard & Roe, P.C.

(57) ABSTRACT

The embodiments of the present invention disclose a parallax bather and a fabricating method thereof. The parallax barrier comprises a first transparent conducting layer (35), a second transparent conducting layer (36), and an insulating layer (37) between the first transparent conducting layer (35) and the second transparent conducting layer (36). The first transparent conductive layer (35) is formed into a plurality of signal electrode lines (350), and the second transparent conductive layer (36) is formed into a plurality of common electrode lines (360). The signal electrode lines (350) and
(Continued)

the common electrode lines (360) are arranged alternately, and the common electrode lines (360) are located in a gap between adjacent signal electrode lines (350) with the insulating layer (37) in between.

20 Claims, 4 Drawing Sheets

(51) Int. Cl.
    *G02B 27/22* (2018.01)
    *H04N 13/04* (2006.01)
    *G02F 1/1341* (2006.01)
    *G02F 1/1343* (2006.01)

(52) U.S. Cl.
    CPC ...... *G02F 1/1345* (2013.01); *G02F 1/133345* (2013.01); *G02F 1/134309* (2013.01); *H04N 13/04* (2013.01)

(56) References Cited

U.S. PATENT DOCUMENTS

| | | | |
|---|---|---|---|
| 8,686,994 B2 | 4/2014 | Lin | |
| 9,500,871 B2* | 11/2016 | Zhang | G02B 27/26 |
| 2006/0146208 A1* | 7/2006 | Kim | G02B 27/2214 |
| | | | 349/15 |
| 2009/0002267 A1* | 1/2009 | Nam | G02B 27/2214 |
| | | | 345/6 |
| 2012/0170115 A1* | 7/2012 | Zhang | G02B 27/2214 |
| | | | 359/465 |
| 2012/0194495 A1* | 8/2012 | Kadowaki | G02B 27/2214 |
| | | | 345/208 |
| 2013/0050626 A1* | 2/2013 | Miyanaga | G02F 1/1345 |
| | | | 349/139 |
| 2013/0100101 A1 | 4/2013 | Li et al. | |
| 2015/0124183 A1* | 5/2015 | Choi | G02B 27/2214 |
| | | | 349/15 |

FOREIGN PATENT DOCUMENTS

| | | |
|---|---|---|
| CN | 103076679 A | 5/2013 |
| CN | 103424941 A | 12/2013 |
| CN | 103676362 A | 3/2014 |
| CN | 103984107 A | 8/2014 |
| JP | 2005-45323 A | 2/2005 |
| TW | 201122645 A | 7/2011 |

OTHER PUBLICATIONS

Notice of Transmittal of the International Search Report of PCT/CN2014/087141 in Chinese, dated Feb. 11, 2015.
Written Opinion of the International Searching Authority of PCT/CN2014/087141 in Chinese with English Translation, dated Feb. 11, 2015.
Third Chinese Office Action of Chinese Application No. 201410184496. 2, dated Jun. 30, 2016 with English translation.
Second Chinese Office Action of Chinese Application No. 201410184496.2, dated Mar. 9, 2016 with English translation.
Chinese Office Action of Chinese Application No. 201410184496.2, dated Sep. 21, 2015 with English translation.

* cited by examiner

PARALLAX BARRIER AND FABRICATING METHOD THEREOF, DISPLAY PANEL AND DISPLAY DEVICE

CROSS REFERENCE TO RELATED APPLICATIONS

This application is the National Stage of PCT/CN2014/087141 filed on Sep. 23, 2014, which claims priority under 35 U.S.C. § 119 of Chinese Application No. 201410184496.2 filed on May 4, 2014, the disclosure of which is incorporated by reference.

FIELD

This invention relates to a parallax barrier and a fabricating method thereof, a display panel and a display device.

BACKGROUND

In a 3D display technology, as illustrated in FIG. 1, a parallax barrier 12 is disposed on a displaying side of a display panel 11 provided with a slit grating. Lights from an image displayed on pixels on the display panel 11 transmit to an observation point through the slits on the parallax barrier 12. As illustrated in FIG. 1, the pixels of the display panel which can be observed by a left eye 13 and a right eye 14 at the observation point are different, therefore the left eye 13 and right eye 14 of the observer at the observation point can see two different images, thus achieving a 3D display. An existing parallax barrier is generally made of a fixed pattern or a LCD. However, for the parallax barrier of the fixed pattern, after the parallax barrier is disposed on the display panel, the display panel can only perform 3D display, and can not be switched to 2D display. Therefore, the existing parallax barrier is usually made of the LCD.

As illustrated in FIG. 2, a parallax barrier made of the LCD known by the inventors comprises: two transparent substrate 21 and 22 cell-assembled together, and a liquid crystal 23 filled between the two transparent substrate 21 and 22. In order to form the slit grating for naked eye 3D display, a transparent conductive layer 24 and 25 are disposed on the two transparent substrate 24 and 25 respectively, and the upper conductive layer 24 is distributed continuously distribution to cover the whole panel, and the lower transparent conductive layer 25 is configured as signal electrode lines 252 and common electrode lines 251 arranged alternately. During operation, a driven voltage is applied to the signal electrode lines 252, and both the common electrode lines 251 and transparent electrode layer 24 are connected to a constant voltage source or the ground. An electric field is generated in a region where the signal electrode lines 252 oppose the transparent electrode layer 24 so as to drive the liquid crystal molecules to deflect so that the region is a light blocking region; whereas in a region where the common electrode lines 251 oppose the transparent electrode layer 24, because the voltage of the common electrode lines 251 is equal to that of the transparent electrode layer 24, the liquid crystal molecules in the region are not deflected, so that the region is a light transmitting region. The light blocking regions and the light transmitting regions are arranged alternately in the parallax bather, which is presented eventually as the slit grating for the naked eye 3D display. The common electrode lines 251 and transparent electrode layer 24 farther avoid a crosstalk between adjacent signal electrode lines 252 and other signal interference.

The inventors have found that in a parallax barrier with the above structure, the gap between the common electrode lines 251 and signal electrode lines 252 is very small (usually about 10 µm), which makes it easy to cause shorting due to problems of poor processing or dust particles, and seriously affects the product yield.

SUMMARY

The embodiments of present invention provide a parallax barrier and a fabricating method thereof, a display panel and a display device, which can solve the problem of easy shorting of the electrodes in the parallax barrier, thereby improving the product yield.

According to embodiments of present invention, a parallax barrier is provided. The parallax barrier comprises: a first transparent conductive layer, a second transparent conductive layer and an insulating layer between the first transparent conductive layer and second conductive layer. The first transparent conductive layer is formed into a plurality of signal electrode lines, and the second transparent conductive layer is formed into a plurality of common electrode lines, and the signal electrode lines and common electrode lines are arranged alternately, and the common electrode lines are located in a gap between adjacent signal electrode lines, with the insulating layer in between.

In an example, the parallax barrier further comprises a first transparent substrate and a second transparent substrate cell assembled together, and a transparent liquid filled in a gap between the first transparent substrate and the second transparent substrate, and the signal electrode lines and the common electrode lines are disposed on the first transparent substrate, and a continuous common electrode layer is disposed on the second transparent substrate.

In an example, the parallax barrier further comprises signal lead lines and common lead lines arranged on the edge of the parallax bather, and the signal lead lines are electrically connected to the signal electrode lines, and the common lead lines are respectively electrically connected to the common electrode lines and the common electrode.

In an example, the signal lead lines and the common lead lines are disposed in a same metal layer. The metal layer is disposed above or below the first transparent conducting layer, or the metal layer is disposed above or below the second transparent conducting layer.

In an example, in a case where the metal layer is disposed above or below the first transparent conducting layer, the signal lead lines are electrically connected to the signal electrode lines by direct contact, and the common lead lines are electrically connected to the common electrode by via holes passing through the insulating layer. In a case where the metal layer is disposed above or below the second transparent conducting layer, the signal lead lines are electrically connected to the signal electrode lines by the via holes passing through the insulating layer, and the common lead lines are electrically connected to the common electrode by direct contact.

The embodiments of the present invention provides a display panel comprising a display unit and a parallax barrier described as above arranged on a light emitting side of the display unit.

The display unit is a LCD display unit, or an OLED display unit, or a PDP display unit.

The embodiments of the present invention provides a display device comprising a parallax barrier as described above, or a display panel as described above.

On the other hand, the embodiment of the present invention provides a fabricating method of the parallax barrier. The method comprises: steps of forming a first cell assembling substrate and a second cell assembling substrate; and cell assembling the first cell assembling substrate and the second cell assembling substrate, and injecting liquid crystal between the first cell assembling substrate and the second cell assembling substrate, wherein the step of forming the first cell assembling substrate comprises: forming a first transparent conductive film layer over a first substrate, and forming a plurality of common electrode lines spaced apart by a patterning process; forming an insulating layer over the first transparent conductive film layer and via holes passing through the insulating layer; forming a second transparent conductive film layer over the insulating layer, and forming a plurality of signal electrode lines spaced apart by a patterning process, and the common electrode lines are located in a gap between adjacent signal electrode lines with the insulating layer in between.

In an example, the step of forming the first cell assembling substrate further comprises: forming a metal layer over a first substrate, and forming signal lead lines and common lead lines by a patterning process, the signal lead lines configured to be electrically connected to the signal electrode lines, and the common lead lines configured to be electrically connected to the common electrode lines and common electrode.

In an example, the steps of forming the metal layer and forming signal lead lines and common lead lines by the patterning process are performed before or after the steps of forming the first transparent conductive film layer and forming the plurality of common electrode lines spaced apart by the patterning process. The signal lead lines are electrically connected to the signal electrode lines by a via hole passing through the insulating layer, and the common lead lines are electrically connected to the common electrode lines by direct contact.

In an example, the steps of forming a metal layer, and forming signal lead lines and common lead lines by the patterning process are performed before or after the steps of forming the second transparent conductive film layer and forming the plurality of signal electrode lines spaced apart by the patterning process. The signal lead lines are electrically connected to the signal electrode lines by direct contact, and the common lead lines are electrically connected to the common electrode lines through the via hole passing through the insulating layer.

In an example, a halftone mask process is used in the step of forming the first cell assembling substrate to reduce number of patterning processes.

In an example, the step of forming the second cell assembling substrate comprises forming a continuous common electrode layer over a second substrate.

According to the parallax barrier and the fabricating method thereof, the display panel and the display device provided by embodiments of present invention, the signal electrode lines and the common electrode lines are produced by two separate layers respectively, that is, the signal electrode lines and the common electrode lines are located respectively in the first transparent conductive layer and the second transparent conductive layer which are insulated from each other, and the common electrode lines are located in the gap between the adjacent signal electrode lines with the insulating layer in between, which increases the insulation reliability between the signal electrode lines and common electrode lines, and solve the problem of easy shorting of the electrodes in the parallax barrier, and improve the product yield.

BRIEF DESCRIPTION OF THE DRAWINGS

The technical solutions in the embodiments of the present invention will be described with reference to accompanying drawings. It is apparent that the drawings mentioned in the following description are only some embodiments of the present invention, and various other drawings can be obtained by those of ordinary skilled in the art without creative labor based on these drawings mention above.

DETAILED DESCRIPTION

The technical solution of the embodiments of the present disclosure will be described clearly and fully in connection with the drawings of the embodiments of the present disclosure. It is obvious that the described embodiments are just a part but not all of the embodiments of the present disclosure. Based on the described embodiments of the present disclosure, those skilled in the art can obtain all other embodiment without any inventive work, which all fall into the scope of the claimed invention.

Unless otherwise defined, technical terms or scientific terms used herein shall have a common meaning known by those skilled in the art of the present disclosure. Words and expressions such as "first", "second" and the like used in the description and claims of the patent application of the present disclosure do not denote any sequence, quantity or importance, but distinguish different components. Likewise, words such as "a", "an" and the like do not denote quantitative restrictions, but denote the presence of at least one. Words such as "connected", "connecting" and the like are not restricted to physical or mechanical connections, but may include electrical connections, regardless of direct or indirect connections. Words such as "up", "below", "left", "right", etc., are only used to denote the relative positional relationship. In a case where the absolute position of the described object changes, the relative positional relationship change correspondingly.

A parallax barrier and a fabricating method thereof, a display panel and a display device provided in embodiments of present invention can fundamentally solve the problem of easy shorting of the electrodes in the parallax bather, and improve the product yield.

The technical solutions of the embodiments of the present invention will be described clearly and completely in connection with the accompanying drawings of the embodiments of the present invention as below. It is apparent that the embodiments described are only a part of the embodiments of the present invention and not all embodiments.

First Embodiment

Figure 1:
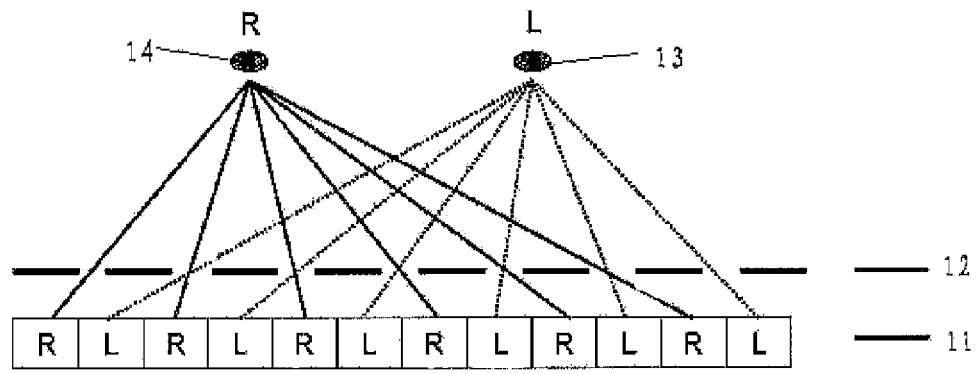
FIG. 1 is a schematic view illustrating a principle of implementing naked eye 3D display by using a parallax barrier.
Figure 2:
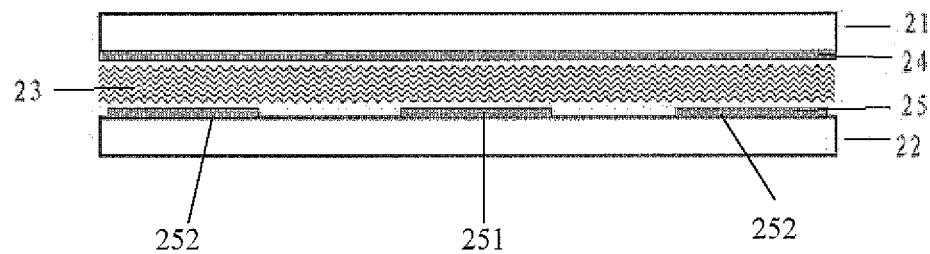
FIG. 2 is a schematic cross sectional view of a parallax barrier known by the inventors.
Figure 3:
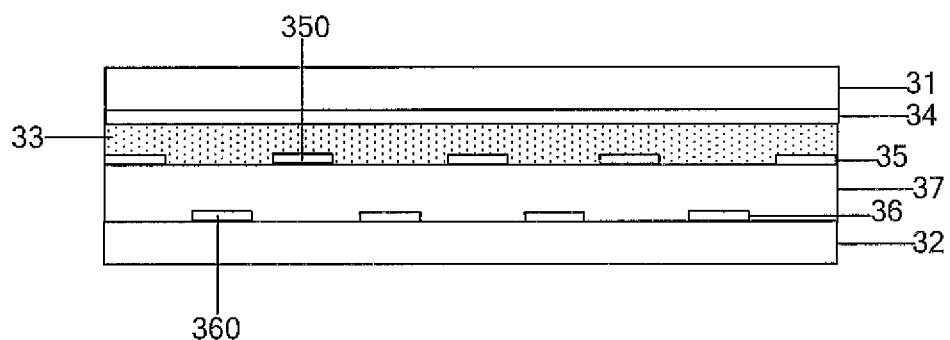
FIG. 3 is a schematic cross sectional view of a parallax barrier according to a first embodiment of the present invention.
Figure 4:
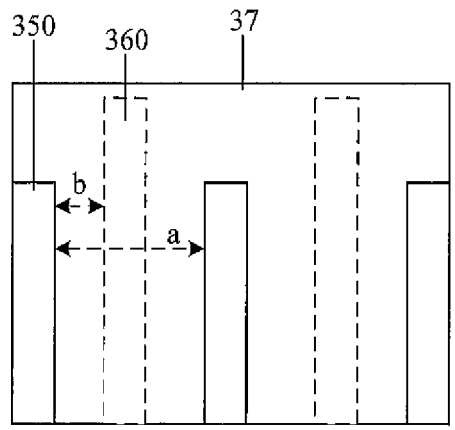
FIG. 4 is a schematic plan view of the parallax bather according to the first embodiment of the present invention, illustrating a position relationship between signal electrode lines and common electrode lines.

FIG. 3 illustrates a parallax barrier provided in present embodiment. The parallax barrier comprises two cell-assembled transparent substrate 31 and 32, and a transparent liquid 33 filled between the two transparent substrate 31 and 32. A second transparent conductive layer 36 for forming common electrode lines 360, an insulating layer 37 and a transparent conductive layer 35 for forming signal electrode lines 350 are disposed on transparent substrate 32 sequentially, and a continuous layer of common electrode 34 is disposed on the transparent substrate 31. FIG. 4 illustrates a position relationship among the signal electrode lines 350, the insulating layer 37 and the common electrode lines 360 in a plane. The common electrode lines 360 are located in the gap between adjacent signal electrode lines 350 with the insulating layer 37 in between. The line width of signal electrode lines 350 and line width of common electrode lines, the gap a between adjacent signal electrode lines 350, and the distance b between common electrode lines 360 and signal electrode lines 350 in a direction parallel to the substrate meet the design requirement of grating.

Taking liquid crystal grating for example, the transparent liquid 33 is a liquid crystal applied by a spin coating method, and a first alignment layer is disposed on a side of the substrate 32 close to the liquid crystal, and a second alignment layer is disposed on a surface of the substrate 31 facing the substrate 32, and the first alignment layer has an alignment orientation perpendicular to (or the same as) that of the second alignment layer. Both the first and second alignment layer are not illustrated, which can be designed by those skilled in the art according to actual condition, and will not be elaborated in present embodiment. Furthermore, it is noted that the first and second alignment layer can be omitted if a blue phase liquid crystal is applied.

During operation, a driven voltage is applied to the signal electrode lines 350, and a constant voltage or a ground signal is applied to the common electrode lines 360 and common electrode 34, and the voltage applied to the signal electrode lines 350 and common electrode 34 are different, and the voltage difference therebetween is equal to or larger than the threshold voltage for rotating the liquid crystal. An electric field is generated in a region corresponding to the signal electrode lines 350 to drives the liquid crystal molecules to be rotated, and whereas in a region corresponding to the common electrode lines 251, because the voltage of common electrode lines 251 is equal to that of transparent electrode layer 24, the liquid crystal molecules are not rotated in the region. The result can produce corresponding alternating dark and bright stripes, thereby performing a 3D display. In a case where no signal is applied to the signal electrode lines 350, common electrode lines 360 and common electrode 34, all liquid crystal molecules are not rotated, thereby performing a 2D display. In summary, the parallax barrier of present embodiment realizes the switching between 2D/3D display.

Figure 5:
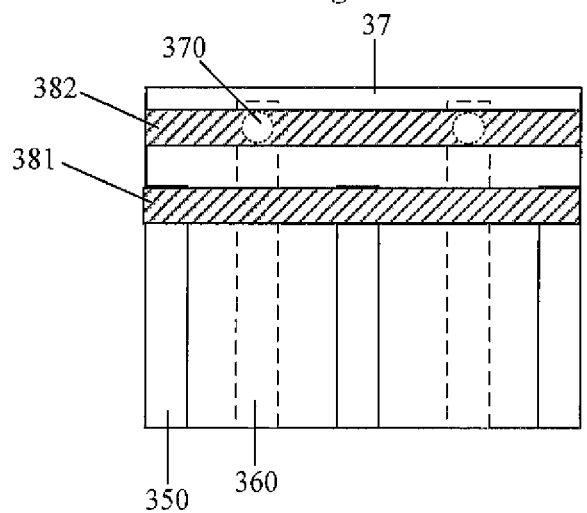
FIG. 5 is a schematic plan view of a lead lines peripheral region of the parallax barrier according to the first embodiment of the present invention.

Furthermore, as illustrated in FIG. 5, the parallax barrier further comprises signal lead lines 381 and common lead lines 382 arranged on the periphery. The signal lead lines 381 are electrically connected to signal electrode lines 350 so as to apply a driving voltage to signal electrode lines 350 during 3D display. The common lead lines 382 are electrically connected to common electrode lines 360 and common electrode 34 respectively, so as to apply a common voltage to the common electrode lines 360 and common electrode 34 during 3D display. In FIG. 5, a metal layer f for forming the signal lead lines 381 and common lead lines 382 is disposed above the first transparent conductive layer, and signal lead lines 381 are electrically connected to signal electrode lines 350 by direct contact, and common lead lines 382 are electrically connected to common electrode lines 360 by via holes 370 passing through insulating layer 37.

Furthermore, the metal layer can also be disposed below first transparent layer 35. In this case, similarly, the signal lead lines 381 are electrically connected to signal electrode lines 350 by direct contact, and common lead lines 382 are electrically connected to common electrode lines 360 by via holes 370 passing through insulating layer 37. Alternatively, the metal layer is disposed above or below second transparent layer 36. In this case, signal lead lines 381 are electrically connected to signal electrode lines 350 by via holes 370 passing through insulating layer 37, and common lead lines 382 are electrically connected to common electrode lines 360 by direct contact. Compared with the embodiment illustrated in FIG. 5, via holes 370 passing through the insulating layer 37 are slightly farther from the periphery of substrate, thus the substrate is more robust and not easy to be damaged.

As illustrated in FIG. 3 and FIG. 4, the parallax barrier provided in embodiments of present invention comprises a plurality of signal electrode lines 350 and common electrode lines 360 arranged alternately. A first transparent conductive layer 35 is formed into signal electrode lines 350, and a second transparent conductive layer 36 is formed into common electrode lines 360, and an insulating layer 37 is disposed between the first transparent conductive layer 35 and second transparent conductive layer 36, and the common electrode lines 360 are in the gap between the adjacent signal electrode lines 350 with the insulating layer in between.

The signal electrode lines 350 and common electrode lines 360 are produced respectively in two separate layers, i.e., signal electrode lines 350 and common electrode lines 360 are located respectively in first transparent conductive 35 and second transparent conductive 360 which are insulated from each other, and common electrode lines 360 are in the gap between adjacent signal electrode lines 350 with insulating layer 37 in between, which increases the insulation reliability between signal electrode lines 350 and common electrode lines 360, and solve the problem of easy shorting of the electrodes in the parallax barrier, and improve the product yield.

The parallax barrier provided in embodiments of present invention can realize the switch between 2D/3D display, and increases the insulation reliability between the signal electrode lines and the common electrode lines, and solve the problem of easy shorting of the electrodes in the parallax barrier, and improve the product yield.

The grating principle and implementation method of the parallax barrier are not limited in embodiments of present invention, and can be any implementation known by those skilled in the art, as long as in a case where power on/power off states are switched, the region corresponding to patterned and transparent signal electrode lines can be switched between light transmitting state and light absorbing state. In addition to the liquid crystal spin coating method mentioned above, the implementation method of the parallax barrier according to the embodiments of present invention further comprises and is limited to the following methods: electrowetting method, electrochromic method or electrochemical deposition method, etc. Those skilled in the art can design according to particular implementation principle.

1. Electrowetting Method

In this method, the transparent liquid can for example comprise colored oil droplets and a transparent solution. Colored oil droplets can for example be black oil droplets, and transparent solution can for example be colorless water, and a medium layer is disposed on the patterned and transparent signal electrode lines, and the transparent liquid has an electrowetting effect with respect to the medium. The medium can for example be an insulating layer with hydrophobic surface.

In a case where No voltage is applied to signal electrode lines, common electrode lines and common electrode, because the sum of surface tension between oil droplet and water and the surface tension between oil droplet and hydrophobic surface of the insulating layer is smaller than the surface tension between the water and hydrophobic surface of the insulating layer, according to the principle of minimum energy in a stable system, the oil drop droplets will automatically spread on the hydrophobic surface of the insulating layer, so that the transparent liquid in the region corresponding to the signal electrode lines is turned into an opaque state in power-off state, forming a light absorbing state pattern having the same shape as that of the patterned electrode in power-off state. The common electrode lines still presents the transparent state since the common electrode lines are not covered by the insulating layer with hydrophobic surface do In a case where a voltage is applied to the signal electrode lines, common electrode lines and common electrode, the same driving voltage is applied to signal electrode lines and common electrode lines, which breaks the original equilibrium, and results in bulging of the oil droplets, thus decreasing the contact area between the oil droplets and the hydrophobic surface of the insulating layer so that the lights can transmit through the transparent liquid in the whole area, and a pattern of the light transmitting state pattern having the same shape as the patterned electrode is formed in power-on state.

2. Electrochromic Method

In this method, the transparent liquid comprises a transparent electrolyte solution, and an electrochromic compound such as a 4,4'-bipyridylium salt dissolved in the electrolyte solution in embodiments of present invention. A voltage can be applied to the electrode. According to electron transfer (reduction or oxidation), the organic electrochromic compound can be switched between a colored state and colorless state, which can realize the switch of between light transmitting state and light absorbing state in a region corresponding to the signal electrode lines.

3. Electrochemical Deposition Method

In this method, the transparent liquid comprises a transparent electrolyte.

The transparent electrolyte in the present embodiment of the invention comprises at least two parts: a reversible reactant and an electrolyte solution. The transparent electrolyte can further comprise some additive such as oxidation-reduction agent, stabilizer, surfactant, antifreeze liquid, etc. For example, the reversible reactant can be organic or inorganic salt. The organic salt can for example be polyaniline, polythiophene, polypyrrole and derivative thereof, etc. The inorganic salt can be Ag salt complexes, silver sulfide, and the like. The electrolyte can be diethyl ether, acetonitrile, boron trifluoride diethyl ether, dimethyl formamide, N-methylpyrrolidone, tetrahydrofuran, dimethyl sulfoxide, and the like, and combinations thereof. When the patterned electrode is in power-on state, the metal particles formed by the reversible reactant in the transparent electrolyte are deposited on the signal electrode lines, which forms a patent with opaque light absorbing state.

Any one of the above three methods can be used to realize the switch between light transmitting state and light absorbing state. In embodiments of present invention, If the signal electrode lines are in light transmitting state, in one example of the transparent barrier, the whole area is transparent and the corresponding light transmittance needs to be higher than 80%, and preferably higher than 92%. The increase of the light transmittance can be achieved by the control of power on or power off time of patterned electrode in the light transmitting state in the embodiment. Generally, the longer the time in a light transmitting state, the higher the light transmittance is. If the pattern is in a light absorbing state, the light transmittance in the region corresponding to the pattern is usually less than 20%, preferable less than 8% in order to ensure the effect of 3D display. The decrease of the light transmittance can be achieved by the control of power on or power off time of patterned electrode in the light absorbing state in the embodiment. The longer the time in a light absorbing state, the lower the light transmittance is. The light transmittance of rest area other than the region corresponding to the signal electrode lines can be maintained close to the light transmittance in transparent state. The implementation method of the grating is not limited in the parallax barrier according to embodiments of present invention.

The embodiments of present invention further provide a display panel, which comprises a display unit and the parallax barrier in the above embodiments.

The parallax barrier can be arranged on a light emitting side of the display unit. Alternatively, the parallax barrier is arranged between the display unit and a backlight. The display unit can for example be a LCD display unit, or an OLED (Organic Electroluminescence Display) display unit, or a PDP (Plasma Display Panel) display unit. The display panel can realize the switch between 2D/3D display, and can be fabricated with high yield.

The embodiments of present invention further provide a display device, which comprises the parallax barrier in the above embodiments, or the display panel described as above. The display panel can realize the switch between 2D/3D display, and can be fabricated with high yield. The display device can for example be: a LCD device, an OLED display device, a PDP display device, an electronic paper, a cell phone, a tablet computer, a television, a monitor, a laptop computer, a digital frame, a navigator and any product or component with a display function.

Second Embodiment

Figure 6:
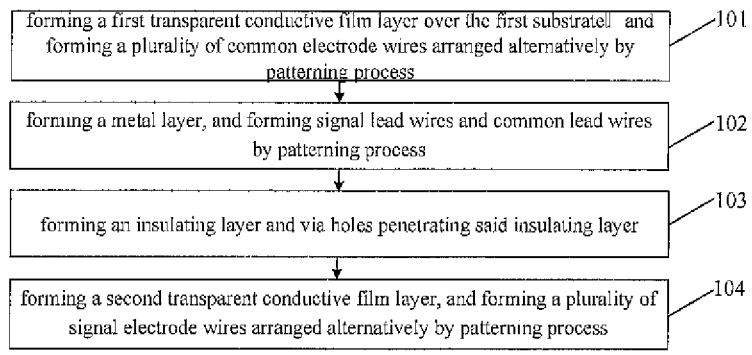
FIG. 6 is a flow chart of a fabricating method of a parallax barrier according to a second embodiment of the present invention.

On the other hand, embodiments of present invention also provide a fabricating method of the parallax barrier. The method comprises: a process of forming a first cell assembling substrate; a process of forming a second cell assembling substrate; and a cell assembling process and a process of injecting liquid crystal. As illustrated in FIG. 3, in the process of forming the second cell assembling substrate, a common electrode 34 is formed on a substrate 31, covering the substrate 31 as a whole layer. As illustrated in FIG. 6, the process of forming the first cell assembling substrate comprises following steps.

In step 101, a first transparent conductive film layer is formed over a first substrate, and a plurality of common electrode lines 360 arranged alternately by a patterning process.

Figure 7:
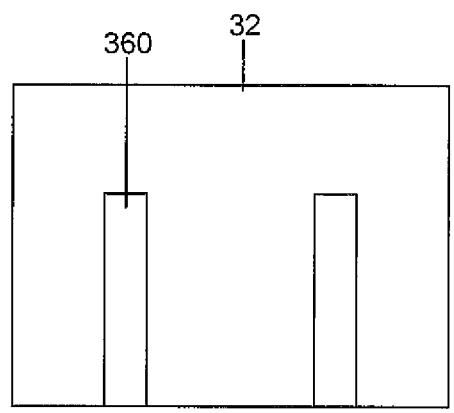
FIG. 7 is a schematic plan view of common electrode lines formed in the second embodiment of the present invention.

In this step, a first transparent conductive film such as ITO is deposited on the first substrate (such as bare glass), and is formed into a pattern of the first transparent conductive film layer by exposing, developing, etching processes, i.e., a plurality of common electrode lines 360 arranged alternately as illustrated in FIG. 7.

In step 102, a metal film layer is formed over the first substrate, and is formed into signal lead lines 381 and common lead lines 382 by a patterning process, and signal lead lines 381 are configured to be electrically connected to signal electrode lines 350, and common lead lines 382 are configured to be electrically connected to common electrode lines 360 and common electrodes.

Figure 8:
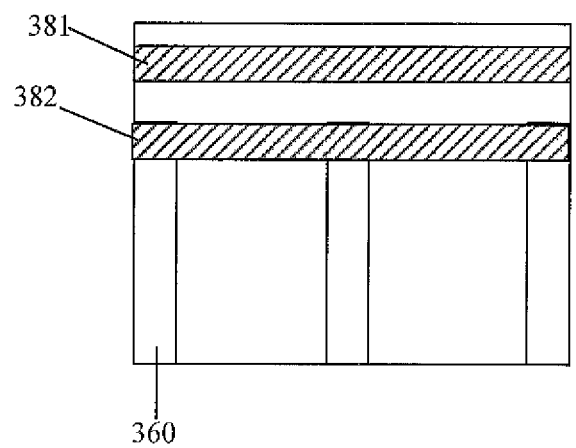
FIG. 8 is a schematic plan view of signal lead lines and common lead lines formed in the second embodiment of the present invention.

In this step, the metal film layer is deposited firstly, and is formed into a pattern of metal layer by exposing, developing, etching processes, i.e., the pattern of the metal layer comprises signal lead lines 381 and common lead lines 382 illustrated in FIG. 8, wherein the outer signal lead lines 381 are electrically connected to the signal electrode lines 350 subsequent formed by via holes, and the inner common lead lines 382 are electrically connected to common electrode lines 360 by overlapping.

In step 103, an insulating layer 37 is formed over the first transparent conductive film layer and via holes 370 passing through insulating layer 37.

Figure 9:
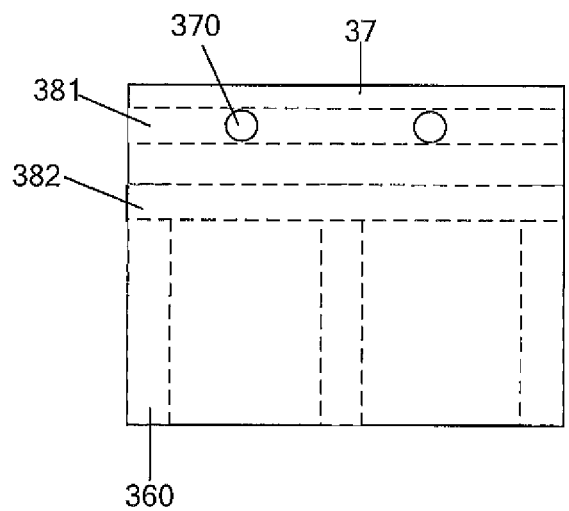
FIG. 9 is a schematic plan view of an insulating layer and via holes formed therein in the second embodiment of the present invention.

In this step, the insulating film layer such as SiNx film is deposited firstly, then via holes 370 are formed in outer signal lead lines 381 by exposing, developing, etching processes, so as to be connected to signal electrode lines 350 subsequent formed, as illustrated in FIG. 9.

In step 104. a second transparent conductive film layer is formed over the insulating layer, and formed into a plurality of signal electrode lines 350 arranged alternately by a patterning process, and the common electrode lines 360 are located in a gap between adjacent signal electrode lines 350 with insulating layer 37 in between.

Figure 10:
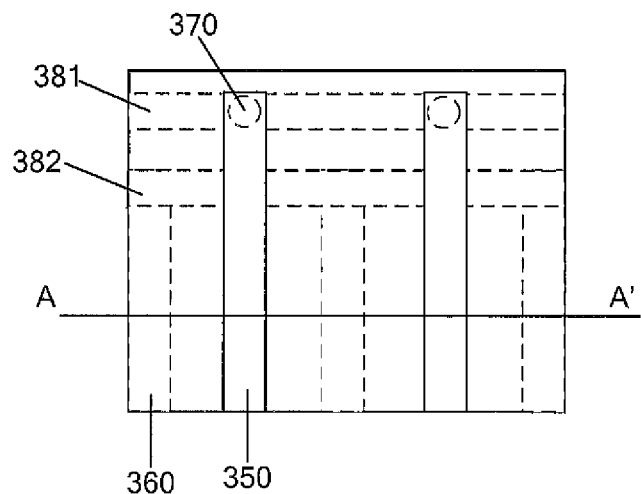
FIG. 10 is a schematic plan view of signal electrode lines formed in the second embodiment of the present invention.

In this step, the second transparent conductive film layer such as ITO is deposited on the substrate, and formed into a pattern which mainly comprises a plurality of signal electrode lines 350 arranged alternately by exposing, developing, etching processes, and the signal electrode lines 350 extends to the positions of via holes 370 passing through insulating layer 37. And the signal electrode lines 350 are electrically connected to lower outer signal lead lines 381 by via holes 370, as illustrated in FIG. 10. The cross-sectional structure taken along A-A' direction of the finally formed first cell assembling substrate is illustrated as the array substrate in FIG. 3.

In a fabricating method of the parallax barrier according to embodiments of present invention, the signal electrode lines and the common electrode lines are produced respectively in two separate layers, so that the common electrode lines are in the gap between the adjacent signal electrode lines with the insulating layer in between, which increases the insulation reliability between the signal electrode lines and common electrode lines, and fundamentally solve the problem of easy shorting of the electrodes in the parallax barrier, and improve the product yield.

It should be noted that in the manufacturing method, alternatively, before the step 101 of forming the first transparent conductive film layer and forming common electrode lines 360 arranged alternately by a patterning process, the step 102 of forming the metal layer and forming signal lead lines 381 and common lead lines 382 by a patterning process can be performed. At this case, similarly, signal lead lines 381 are electrically connected to signal electrode lines 350 by via holes 370 passing through insulating layer 37, and the common lead lines 382 are electrically connected to common electrode lines 360 by direct contact (i.e. overlapping).

Furthermore, alternatively the step 102 of forming the metal layer and forming signal lead lines 381 and common lead lines 382 by a patterning process can be performed before or after the step 104 of forming the second transparent conductive film layer and forming a plurality of common electrode lines 360 arranged alternately by a patterning process. At this case, signal lead lines 381 are electrically connected to signal electrode lines 350 by direct contact, and common lead lines 381 are electrically connected to common electrode lines 360 by via holes 370 passing through insulating layer 37.

Figure 11:
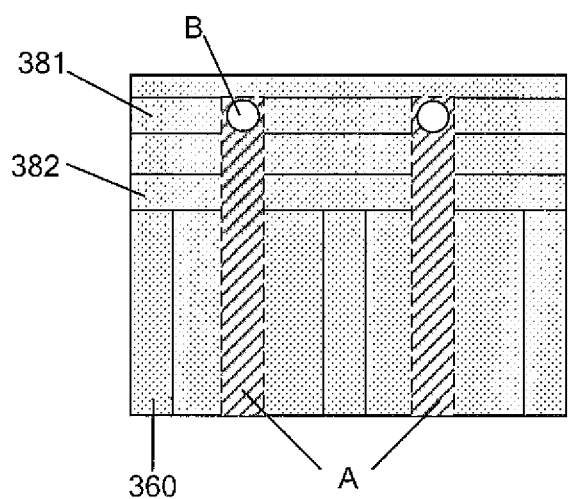
FIG. 11 is a schematic view illustrating a thickness distribution of the photoresist layer formed with a halftone mask exposure process in the second embodiment of the present invention.

Furthermore, in the process of forming the first cell assembling substrate, a halftone mask process can preferably be employed to reduce the times of patterning process. For example, the insulating layer via holes in step 103 and the common electrode lines in step 104 in the above method can be completed in a single patterning process with a halftone mask. For example, in the step 103, a film formation step of insulating layer is performed first, that is, a layer of insulating material layer is deposited, then a photoresist is applied and exposed by a halftone mask process (the second patterning process), and the photoresist layer as illustrated in FIG. 11 is formed. The photoresist in a region B to be formed with via holes is stripped completely; the photoresist in a region A to be formed with signal electrode lines is reserved with a first thickness; the photoresist in rest areas other than the region A and region B is reserved with a second thickness, and the second thickness is greater than the first thickness. Then the via holes is etched by a dry etching method, and the photoresist with the first thickness in region A is removed, and the photoresist with second thickness is thinned by an ashing process. Then the film forming process of the step 104 is performed, that is, the second transparent conductive film layer is formed. Finally the photoresist with the second thickness is removed by a photoresist stripping process, thus the second transparent conductive film layer except that in the region A corresponding to the pattern of signal electrode lines and the area B corresponding to the pattern of via holes is stripped together with the photoresist, thereby forming the signal electrode lines covering the via holes region. Those skilled in the art can conceive according to actual condition without limitation to the methods described above.

For convenience of clear description, first, second and the like are used to distinguish similar items, and the first, second and the like are not quantitative restriction to present invention, but are just an illustration of a preferably manner, and all similar modification and related extension which are readily conceivable by those skilled in the art based on the disclosure of the present invention fall within the protection scope of present invention.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable the skilled in the art to best utilize the invention in various embodiments and with various modifications as are suited to the particular use contemplated. It is intended that the scope of the invention be defined by the claims appended hereto.

The present application claims the benefits of Chinese patent application No. 201410184496.2 filed in May 4, 2014, which is incorporated herein by reference in its entirety.

What is claimed is:

1. A parallax barrier comprising:
   a first transparent conducting layer, a second transparent conducting layer, and an insulating layer between the first transparent conducting layer and the second transparent conducting layer;
   the first transparent conductive layer being formed into a plurality of signal electrode lines, and the second transparent conductive layer being formed into a plurality of common electrode lines, the signal electrode lines and the common electrode lines are arranged alternately, and the common electrode lines are located in a gap between adjacent signal electrode lines, with the insulating layer in between,
   a first transparent substrate and a second transparent substrate cell assembled, and a transparent liquid filled between the first transparent substrate and the second transparent substrate; the signal electrode lines and the common electrode lines being disposed on the first transparent substrate, and a continuous common electrode layer being disposed on the second transparent substrate, a signal lead line and a common lead line arranged on edges of the parallax barrier;
   wherein the signal lead line and the common lead line are disposed in a same metal layer; the signal lead line is electrically connected with the signal electrode lines, and the common electrode lines and the common electrode layer on the second transparent substrate are electrically connected by the common lead line to receive a same voltage signal;
   the signal lead line is electrically connected with the signal electrode lines through direct contact by overlapping without via holes, and the common lead line is electrically connected with the common electrode lines through via holes passing through the insulating layer; or, the common lead line is electrically connected with the common electrode lines through direct contact by overlapping without via holes, and the signal lead line is electrically connected with the signal electrode lines through via holes passing through the insulating layer.

2. The parallax barrier according to claim 1, wherein the metal layer is located above or below the first transparent conducting layer; or the metal layer disposed above or below the second transparent conducting layer.

3. The parallax barrier according to claim 2, wherein in a case where the metal layer is disposed above or below the first transparent conducting layer, the signal lead line is electrically connected to the signal electrode lines by direct contact without via holes, and the common lead line is electrically connected to the common electrode lines by the via holes passing through the insulating layer;
   in a case where the metal layer is disposed above or below the second transparent conducting layer, the signal lead line is electrically connected with the signal electrode lines by the via holes passing through the insulating layer, and the common lead line is electrically connected to the common electrode lines by direct contact without via holes.

4. A display device comprising the parallax barrier according to claim 1.

5. The display device according to claim 4, wherein the metal layer is located above or below the first transparent conducting layer; or the metal layer disposed above or below the second transparent conducting layer.

6. The display device according to claim 5, wherein in a case where the metal layer is disposed above or below the first transparent conducting layer, the signal lead line is electrically connected to the signal electrode lines by direct contact without via holes, and the common lead line is electrically connected with the common electrode lines by the via holes passing through the insulating layer; in a case where the metal layer is disposed above or below the second transparent conducting layer, the signal lead line is electrically connected to the signal electrode lines by the via holes passing through the insulating layer, and the common lead line is electrically connected to the common electrode lines by direct contact without via holes.

7. The display device as in claim 4, wherein the transparent liquid comprises a transparent electrolyte solution.

8. The display device as in claim 7, wherein the transparent electrolyte solution comprises at least two parts, a reversible reactant and an electrolyte solution.

9. The parallax barrier as in claim 1 wherein the transparent liquid comprises a transparent electrolyte solution.

10. The parallax barrier as in claim 9, wherein the transparent electrolyte solution comprises at least two parts a reversible reactant and an electrolyte solution.

11. A method of fabricating a parallax barrier comprising steps of forming a first cell assembling substrate and a second cell assembling substrate; and cell assembling the first cell assembling substrate and the second cell assembling substrate, and injecting liquid crystal between the first cell assembling substrate and the second cell assembling substrate, wherein the step of forming the first cell assembling substrate comprises:
   forming a first transparent conductive film layer over a first substrate, and forming a plurality of common electrode lines spaced apart by patterning process;
   forming an insulating layer over the first transparent conductive film layer and via holes passing through the insulating layer;
   forming a second transparent conductive film layer over the insulating layer, and forming a plurality of signal electrode lines spaced apart by a patterning process, and the common electrode lines are located in a gap between adjacent signal electrode lines with the insulating layer in between;

wherein the step of forming the second cell assembling substrate comprises forming a continuous common electrode layer over a second substrate;

wherein the step of forming the first cell assembling substrate further comprises:

forming a metal layer over a first substrate, and forming a signal lead line and a common lead line by a patterning process to the metal layer, the signal lead line configured to be electrically connected to the signal electrode lines through direct contact by overlapping without via holes and the common lead lines configured to electrically connect with the common electrode lines through the via holes passing through the insulating layer, or the common lead line configured to be electrically connected with the common electrode lines through direct contact by overlapping without via holes and the signal lead line configured to be electrically connected to the signal electrode lines through the via holes passing through the insulating layer;

the step of forming the metal layer is performed before or after the step of forming the common electrode lines, or the step of forming the metal layer is performed before or after the step of forming the signal electrode lines.

12. The method according to claim 11, wherein in a case that the step of forming the metal layer is performed before or after the step of forming the common electrode lines, the signal lead lines are electrically connected to the signal electrode lines by the via holes passing through the insulating layer, and the common lead lines are electrically connected to the common electrode lines by direct contact by overlapping without via holes.

13. The method according to claim 11, wherein in a case that the step of forming the metal layer is performed before or after the step of forming the signal electrode lines, the signal lead lines are electrically connected to the signal electrode lines by direct contact by overlapping without via holes, and the common lead line is electrically connected to the common electrode lines through the via holes passing through the insulating layer.

14. The method according to claim 11, wherein a halftone mask process is used in the step of forming the first cell assembling substrate to reduce number of patterning processes.

15. A display panel comprises a display unit and a parallax barrier arranged on a light emitting side of the display unit, the parallax barrier comprising:

a first transparent conducting layer, a second transparent conducting layer, and an insulating layer between the first transparent conducting layer and the second transparent conducting layer;

the first transparent conductive layer being formed into a plurality of signal electrode lines, and the second transparent conductive layer being formed into a plurality of common electrode lines, the signal electrode lines and the common electrode lines are arranged alternately, and the common electrode lines are located in a gap between adjacent signal electrode lines, with the insulating layer in between, a first transparent substrate and a second transparent substrate cell assembled, and a transparent liquid filled between the first transparent substrate and the second transparent substrate; the signal electrode lines and the common electrode lines being disposed on the first transparent substrate, and a continuous common electrode layer being disposed on the second transparent substrate;

a signal lead line and a common lead line arranged on edges of the parallax barrier and the signal lead line and the common lead line are disposed in a same metal layer; the signal lead line is electrically connected with the signal electrode lines, and the common electrode lines and the common electrode layer on the second transparent substrate are electrically connected by the common lead line to receive a same voltage signal;

the signal lead line is electrically connected with the signal electrode lines through direct contact by overlapping without via holes, and the common lead line is electrically connected with the common electrode lines through via holes passing through the insulating layer; or, the common lead line is electrically connected with the common electrode lines through direct contact by overlapping without via holes, and the signal lead line is electrically connected with the signal electrode lines through via holes passing through the insulating layer.

16. The display panel according to claim 15, wherein the display unit is a liquid crystal display unit, or an OLED display unit, or a PDP display unit.

17. The display panel according to claim 15, wherein the metal layer is located above or below the first transparent conducting layer; or the metal layer disposed above or below the second transparent conducting layer.

18. The display panel according to claim 17, wherein in a case where the metal layer is disposed above or below the first transparent conducting layer, the signal lead line is electrically connected with the signal electrode lines by direct contact by overlapping without via holes, and the common lead lines are electrically connected to the common electrode lines by the via holes passing through the insulating layer;

in a case where the metal layer is disposed above or below the second transparent conducting layer, the signal lead line is electrically connected to the signal electrode lines by the via holes passing through the insulating layer, and the common lead line is electrically connected to the common electrode lines by direct contact by overlapping without via holes.

19. The display panel as in claim 15, wherein the transparent liquid comprises a transparent electrolyte solution.

20. The display panel as in claim 19, wherein the transparent electrolyte solution comprises at least two parts, a reversible reactant and an electrolyte solution.

* * * * *